US011612233B2

(12) United States Patent
Davidson (10) Patent No.: US 11,612,233 B2
(45) Date of Patent: Mar. 28, 2023

(54) HYDRATION DEVICE

(71) Applicant: Andrew Steven Davidson, Aberdeen (GB)

(72) Inventor: Andrew Steven Davidson, Aberdeen (GB)

(73) Assignee: MIX INNOVATIONS LIMITED, Scotland (GB)

(*) Notice: Subject to any disclaimer, the term of this patent is extended or adjusted under 35 U.S.C. 154(b) by 425 days.

(21) Appl. No.: 16/753,191

(22) PCT Filed: Oct. 4, 2018

(86) PCT No.: PCT/GB2018/052828
§ 371 (c)(1),
(2) Date: Apr. 2, 2020

(87) PCT Pub. No.: WO2019/069079
PCT Pub. Date: Apr. 11, 2019

(65) Prior Publication Data
US 2020/0253361 A1    Aug. 13, 2020

(30) Foreign Application Priority Data

Oct. 4, 2017  (GB) ...................................... 1716186
Nov. 6, 2017  (GB) ...................................... 1718356
(Continued)

(51) Int. Cl.
*A45F 3/18*    (2006.01)
*A45F 3/20*    (2006.01)
(Continued)

(52) U.S. Cl.
CPC .................. *A45F 3/18* (2013.01); *A45F 3/20* (2013.01); *A47J 31/005* (2013.01); *A47J 31/407* (2013.01);
(Continued)

(58) Field of Classification Search
CPC ... A45F 3/18; A45F 2200/0583; A47J 31/005; A47J 31/407; A41D 2400/46
See application file for complete search history.

(56) References Cited

U.S. PATENT DOCUMENTS 8,622,249 B1 * 1/2014 Ballentine ................. A45F 3/20
                                                       222/548
9,375,742 B1   6/2016 Yoked
(Continued)

FOREIGN PATENT DOCUMENTS

WO        2010038015 A1    4/2010
WO        2011115618 A1    9/2011
(Continued)

OTHER PUBLICATIONS

International Search Report for corresponding PCT Application No. PCT/GB2018/052828, dated Feb. 22, 2019.

*Primary Examiner* — Omar Flores Sanchez
(74) *Attorney, Agent, or Firm* — Tarolli, Sundheim, Covell & Tummino LLP (57) ABSTRACT

A portable hydration device for use with a portable hydration system is described. The portable hydration device comprises a housing having an inlet, configured to be in fluid communication with a reservoir of water, and an outlet configured to be in fluid communication with a mouthpiece; the housing defining a throughbore connecting the inlet and the outlet. The device also includes a receptacle configured to contain an additive and a selector. The selector is movable between an engaged position in which the selector is engaged with the receptacle and a disengaged position in which the selector is disengaged from the receptacle. In the engaged position the selector permits fluid communication between the receptacle and the throughbore and in the disengaged position the selector prevents fluid communication between the receptacle and the throughbore. The selec-
(Continued)

tor defines a throughbore, the selector throughbore being aligned with the housing throughbore in the engaged and the disengaged positions.

17 Claims, 8 Drawing Sheets

(30) Foreign Application Priority Data

Nov. 7, 2017 (GB) ...................................... 1718431
Dec. 5, 2017 (GB) ...................................... 1720243

(51) Int. Cl.
*A47J 31/40* (2006.01)
*A47J 31/00* (2006.01)
*A45F 3/04* (2006.01)
*A45F 3/16* (2006.01)

(52) U.S. Cl.
CPC ............ *A41D 2400/46* (2013.01); *A45F 3/04* (2013.01); *A45F 2003/166* (2013.01); *A45F 2200/0583* (2013.01)

(56) References Cited

U.S. PATENT DOCUMENTS

| | | | |
|---|---|---|---|
| 2017/0079413 A1 | 3/2017 | Guerrero | |
| 2020/0095031 A1* | 3/2020 | Cheng | B65D 23/102 |
| 2020/0113370 A1* | 4/2020 | Noall | B01F 23/451 |
| 2021/0106167 A1* | 4/2021 | Crozier | A47J 31/468 |
| 2022/0125234 A1* | 4/2022 | Richardson | A23F 5/262 |

FOREIGN PATENT DOCUMENTS

| | | |
|---|---|---|
| WO | 2016081925 A1 | 5/2016 |
| WO | 2017152192 A1 | 9/2017 |

* cited by examiner

HYDRATION DEVICE

RELATED APPLICATIONS

The present invention is a U.S. National Stage under 35 USC 371 patent application, claiming priority to Serial No. PCT/GB2018/052828, filed on 4 Oct. 2018; which claims priority from 1716186.0, filed 4 Oct. 2017, 1718356.7, filed 6 Nov. 2017, 1718431.8, filed 7 Nov. 2017, and 1720243.3, filed 5 Dec. 2017, all of which are incorporated herein by reference.

FIELD

The present invention relates to portable hydration devices. Particularly but not exclusively, the present invention relates to portable hydration devices used during sporting endurance activities.

BACKGROUND

There are many situations in which a person has to carry a portable supply of water and drink, such as in endurance sports, survival training, climbing, etc. In some situations, such as during competitive sports, it may not be desirable to stop an activity to a take a drink or is more comfortable or convenient to drink without using the hands, such as in long distance running, mountain biking, etc.

In these situations, a portable hydration system is often used. Portable hydration systems normally comprise a liquid reservoir, attached, for example, to the person's body, connected to a mouthpiece by a flexible conduit. The person drinks the liquid by sucking on the mouthpiece as and when desired.

The liquid used in these portable hydration systems can be water or, during prolonged activity it may be a sports drink containing electrolytes, glucose or the like. These drinks are consumed to replace the nutrients consumed by the body during the activity.

While it is desirable to drink sport drinks during intense and prolonged exercise, overconsumption can adversely affect the user's ability to continue exercising at an intense level. To avoid this situation, users often carry a supply of water and the supply of sports drink or use an alternative method of intake of nutrients such as bars, gels, etc., which can consume time, adversely affect the sporting activity or simply cannot be easily done.

There are additional reasons why it is not advisable to use a portable hydration system to carry anything other than plain water. For example, after use, the liquid container of drinking equipment becomes prone to bacterial growth, staining and an aftertaste, due to residue, if this is not exhaustively washed off.

SUMMARY

According to a first aspect of the present invention there is provided a portable hydration device for use with a portable hydration system, the portable hydration device comprising:

a housing having an inlet, configured to be in fluid communication with a reservoir of water, and an outlet configured to be in fluid communication with a mouthpiece; the housing defining a throughbore connecting the inlet and the outlet;

a receptacle configured to contain an additive; and a selector, the selector being movable between an engaged position in which the selector is engaged with the receptacle and a disengaged position in which the selector is disengaged from the receptacle, in the engaged position the selector permitting fluid communication between the receptacle and the throughbore and in the disengaged position the selector preventing fluid communication between the receptacle and the throughbore;

wherein the selector defines a throughbore, the selector throughbore being aligned with the housing throughbore in the engaged and the disengaged positions.

In an embodiment of the invention, providing a portable hydration device in which a user can selectively introduce a nutrient additive into a water flow allows a user to choose between plain water or a diluted additive. By using a selector which is aligned with the housing throughbore in both the engaged and disengaged positions allows, for example, for water to be delivered or, for example, a hypotonic sports drink or the like with a consistent volume of additive.

The additive may be a liquid additive.

The additive may include one or more flavourings, one or more sugars, one or more electrolytes, caffeine, one or more carbohydrates, one or more sweeteners, one or more vitamins and/or any other suitable additive.

The additive may be in the form of a concentrate.

The selector may move laterally across the housing throughbore in moving from the disengaged to the engaged position.

The selector may rotate in moving from the disengaged to the engaged position.

The selector may rotate 180° in moving between the disengaged and the engaged positions. A half rotation of the selector ensures the selector throughbore is aligned with the housing throughbore in both the engaged and disengaged positions.

The selector may rotate a multiple of 180° in moving between the disengaged and the engaged positions. In some embodiments, any suitable angle could be used.

The device may include an at least one indication mechanism to indicate to the user that the device is in the engaged and/or disengaged positions.

The/each indication mechanism may be a stop on the surface of the device.

The receptacle may include a seal, the seal being normally closed.

In the engaged position the selector may be engaged with the contents of the receptacle.

In the disengaged position the selector may be disengaged from the receptacle.

In the engaged position, the selector may open the receptacle seal. By engaging with the receptacle and opening the receptacle seal, a flow of additive can be released from the receptacle.

The selector may include a one way valve. This is to ensure additive does not enter the selector throughbore or the housing throughbore until a suction is applied on the inlet by the user.

The housing inlet may include a one way valve. This is to ensure that additive or does not flow back, in use, into the reservoir of water.

In use, a suction applied to the device outlet applies an opening pressure to both the inlet one way valve and the selector one way valve. If the selector is in the disengaged position then only water will flow through the device outlet, however, if the selector is in the engaged position then additive diluted with water will flow through the device outlet.

The housing may define an interior void adapted to receive the receptacle.

The receptacle may be a cartridge.

The cartridge may be refillable.

In an alternative embodiment, the cartridge may be disposable.

In a further alternative embodiment, the housing void may define the receptacle.

The housing may comprise an upper housing and a lower housing, the upper housing being separable from the lower housing to provide access to the housing void.

The device may include a release mechanism for releasing the upper housing from the lower housing.

The release mechanism may also act as at least one of the indicator mechanisms.

In one embodiment the release mechanism acts as a stop to indicate to the user that the selector has reached the disengaged position.

The outlet may be defined by an outlet port and the inlet defined by an inlet port, the inlet and outlet ports may be interchangeable. This permits the device to be used on either the left side or the right side of the user's body with equal utility.

The inlet port may be directly connectable to a user mouthpiece. Such an arrangement permits the user to remove the inlet port from the device and connect the inlet port directly to the mouthpiece to allow the user to continue drinking water in the event of the user not wishing to use the device for any reason.

According to a second aspect of the present invention there is provided a portable hydration device for use with a portable hydration system, the portable hydration device comprising:

a housing having an inlet, configured to be in fluid communication with a reservoir of water, and an outlet configured to be in fluid communication with a mouthpiece; the housing defining a throughbore connecting the inlet and the outlet;

a receptacle configured to a contain an additive; and a selector, the selector being movable between an engaged position in which the selector is engaged with the receptacle and a disengaged position in which the selector is disengaged from the receptacle, in the engaged position the selector permitting fluid communication between the receptacle and the throughbore and in the disengaged position the selector preventing fluid communication between the receptacle and the throughbore;

wherein in moving from the disengaged to the engaged positions the selector moves laterally across the throughbore.

In an embodiment of the invention, providing a portable hydration device in which a user can selectively introduce a nutrient additive into a water flow allows a user to choose between plain water or a diluted additive. By using a selector which moves laterally across the throughbore, a simple press or rotation of a selector actuator can be employed to introduce the additive into the flow of water making it simple for a user to use when in, for example, a race environment.

According to a third aspect of the present invention there is provided a portable hydration device for use with a portable hydration system, the portable hydration device comprising:

a housing having an inlet, configured to be in fluid communication with a reservoir of water, and an outlet configured to be in fluid communication with a mouthpiece; the housing defining a throughbore connecting the inlet and the outlet;

a receptacle configured to a contain an additive; and a selector, the selector being movable between an engaged position in which the selector is engaged with the receptacle and a disengaged position in which the selector is disengaged from the receptacle, in the engaged position the selector permitting fluid communication between the receptacle and the throughbore and in the disengaged position the selector preventing fluid communication between the receptacle and the throughbore;

wherein the housing inlet and housing outlet can be swapped.

According to a fourth aspect of the present invention there is provided a portable hydration device for use with a portable hydration system, the portable hydration device comprising:

a housing having an inlet, configured to be in fluid communication with a reservoir of water, and an outlet configured to be in fluid communication with a mouthpiece; the housing defining a throughbore connecting the inlet and the outlet;

a receptacle configured to a contain an additive; and a selector, the receptacle being movable between an engaged position in which the selector is engaged with the receptacle and a disengaged position in which the selector is disengaged from the receptacle, in the engaged position the selector permitting fluid communication between the receptacle and the throughbore and in the disengaged position the selector preventing fluid communication between the receptacle and the throughbore;

wherein the selector defines a throughbore, the selector throughbore being aligned with the housing throughbore in the engaged and the disengaged positions.

The receptacle may be movable with respect to the selector by pressing receptacle towards the selector.

The receptacle may be movable between the disengaged position and the engaged position by pressing.

The receptacle may be movable between the engaged position and the disengaged position by pressing.

The receptacle may be movable between the engaged position and the disengaged position under the action of a spring or other mechanical device.

The receptacle may be movable between the engaged position and the disengaged position by pulling on the receptacle.

The device may include a release button to return the receptacle from the engaged position to the disengaged position.

The receptacle may be movable between the engaged position and the disengaged position under the action of a spring or other mechanical device.

According to a fifth aspect of the present invention there is provided a portable hydration device for use with a portable hydration system, the portable hydration device comprising:

a housing having an inlet, configured to be in fluid communication with a reservoir of water, and an outlet configured to be in fluid communication with a mouthpiece; the housing defining a throughbore connecting the inlet and the outlet;

a receptacle configured to a contain an additive; and a selector, the receptacle being movable between an engaged position in which the selector is engaged with the receptacle and a disengaged position in which the selector is disengaged from the receptacle, in the engaged position the selector permitting fluid communication between the receptacle and the throughbore and in the disengaged position the selector preventing fluid communication between the receptacle and the throughbore;

wherein the housing inlet and housing outlet can be swapped.

According to a sixth aspect of the present invention there is provided a portable hydration device for use with a portable hydration system, the portable hydration device comprising:

a housing having an inlet port, configured to be in fluid communication with a reservoir of water, and an outlet port configured to be in fluid communication with a mouthpiece;

wherein the inlet port is removable from the device and directly connectable to the mouthpiece, such that the mouthpiece is in direct fluid communication with the reservoir of water.

It will be understood features listed as non-essential with respect to one aspect may be equally applicable to another aspect but have not been repeated for brevity.

BRIEF DESCRIPTION OF THE DRAWINGS

An embodiment of the present invention will now be described with reference to the accompanying Figures in which.

DETAILED DESCRIPTION OF THE DRAWINGS

Figure 1:
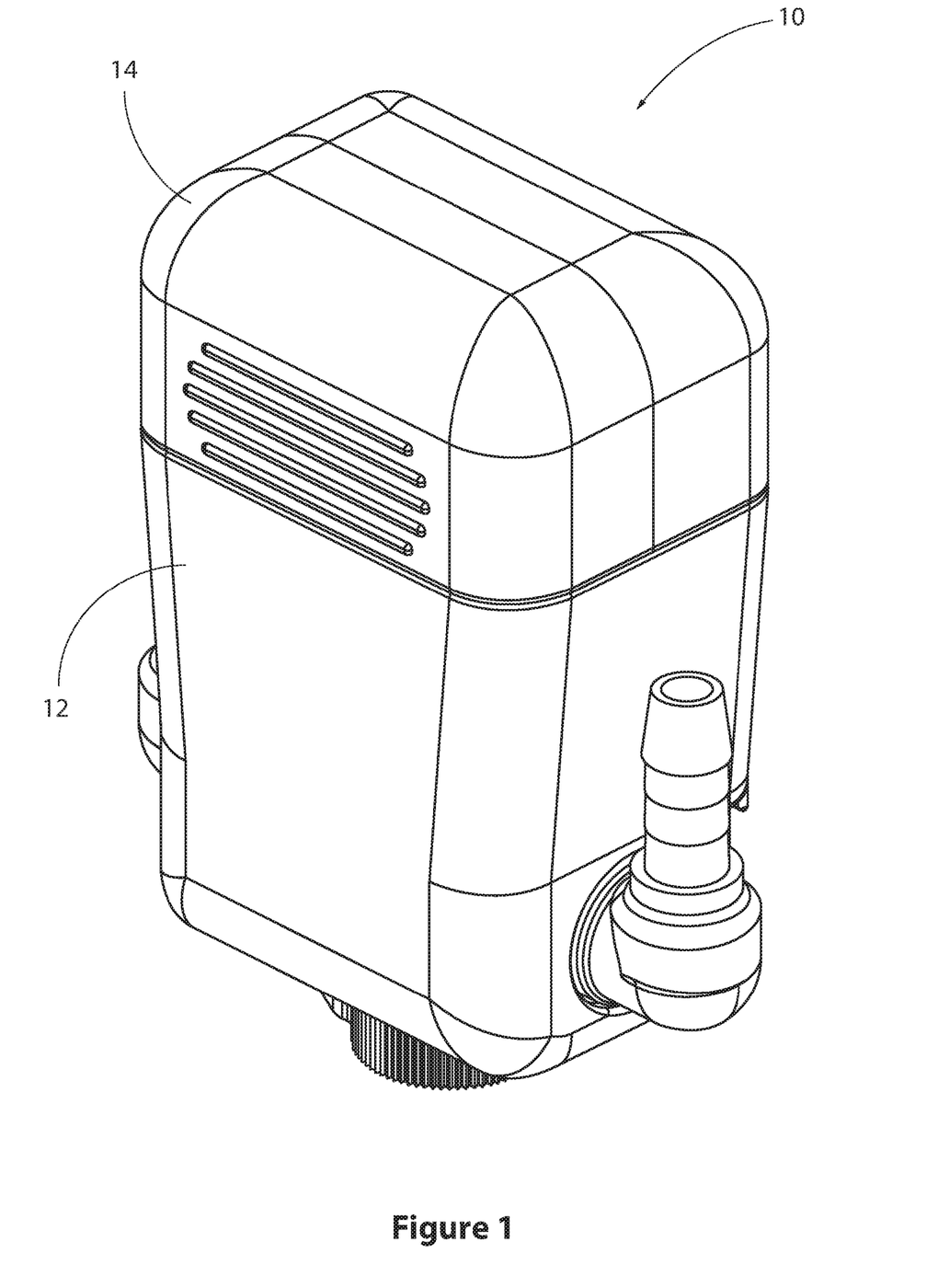
FIG. 1 is a perspective view of a hydration device according to a first embodiment of the present invention.
Figure 2:
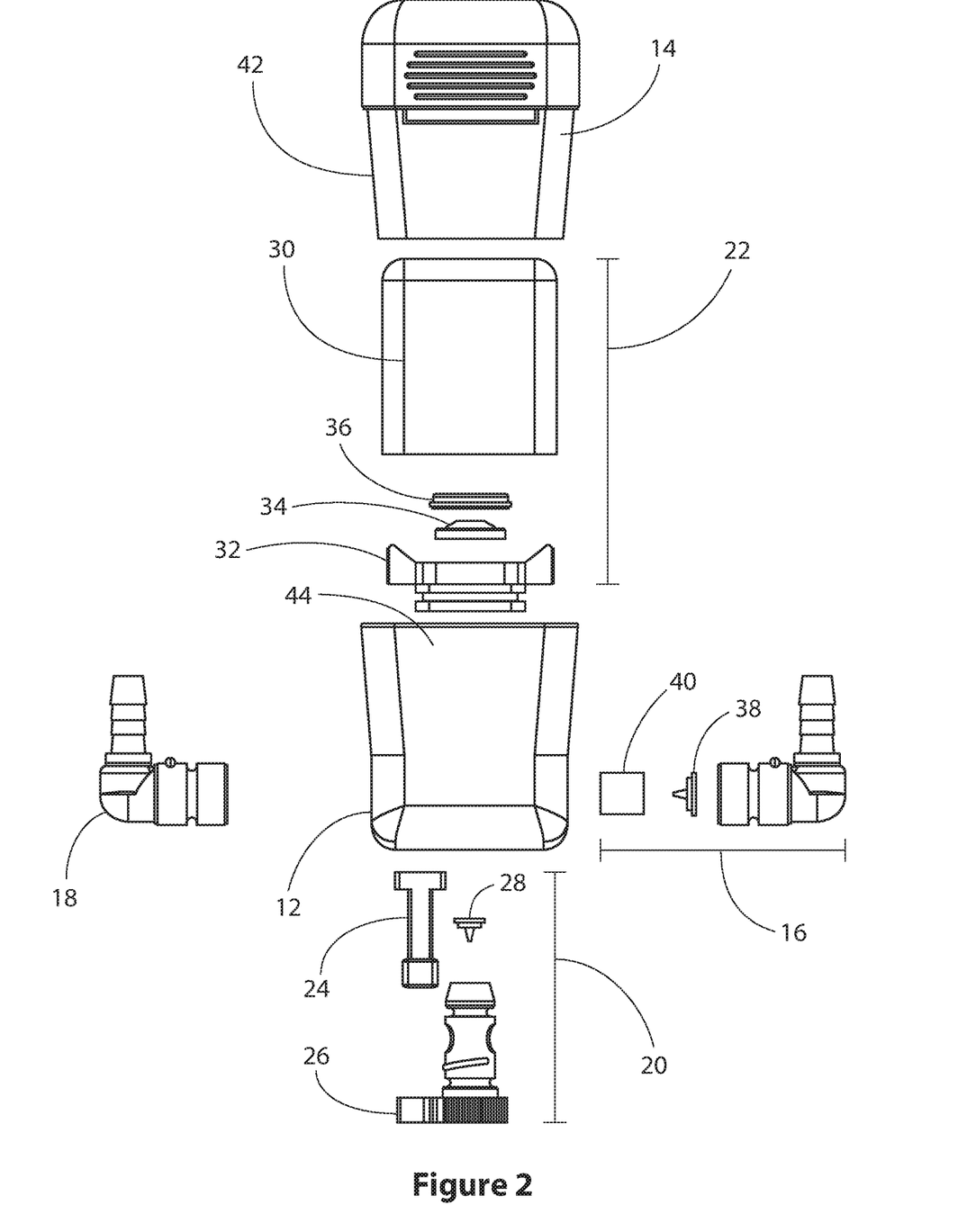
FIG. 2 is an exploded side view of the device of FIG. 1.

Reference is first made to FIG. 1, a perspective view of a portable hydration device, generally indicated by reference numeral 10, in accordance with a first embodiment of the invention, and FIG. 2, an exploded view of the device 10 of FIG. 1.

The device 10 comprises a lower housing 12 and an upper housing 14. The upper housing 14 clips into the lower housing 12; an upper housing tapered portion 42 being received a void 44 defined by the lower housing 12. Contained inside the hydration device housing 12, 14 is a receptacle 22 in the form of a disposable additive cartridge. The additive cartridge 22 comprises a container 30, a container closure 32, the container closure 32 having a seal 34 held in place by a seal fixing 36. The purpose of this seal 34 will be described in due course.

The portable hydration device 10 further includes an inlet port 16 adapted to receive water from a water container (not shown) via a tube (not shown) and an outlet 18 intended to be in fluid communication with the user mouthpiece via a tube (not shown). The inlet and outlet 16, 18 are secured to the lower housing 12 by bayonet connections and are interchangeable depending on the user's preference as to which side to apply a suction to the device 10. The inlet 16 is provided with a one-way valve 38 which is held in place by valve fixing 40. The purpose of this one-way valve 38 will be discussed in due course.

Inserted into the base of the lower housing 12 is a selector 20. The selector 20 can be rotated by a selector lever 26, rotation of the selector 20 moving it from a disengaged position in which the selector 20 is displaced from the additive cartridge 22 to an engaged position in which the selector 20 opens the seal 34 on the additive cartridge 22, permitting flow from the additive cartridge 22 through a selector one-way valve 28 and into the lower housing 12.

Figure 3:
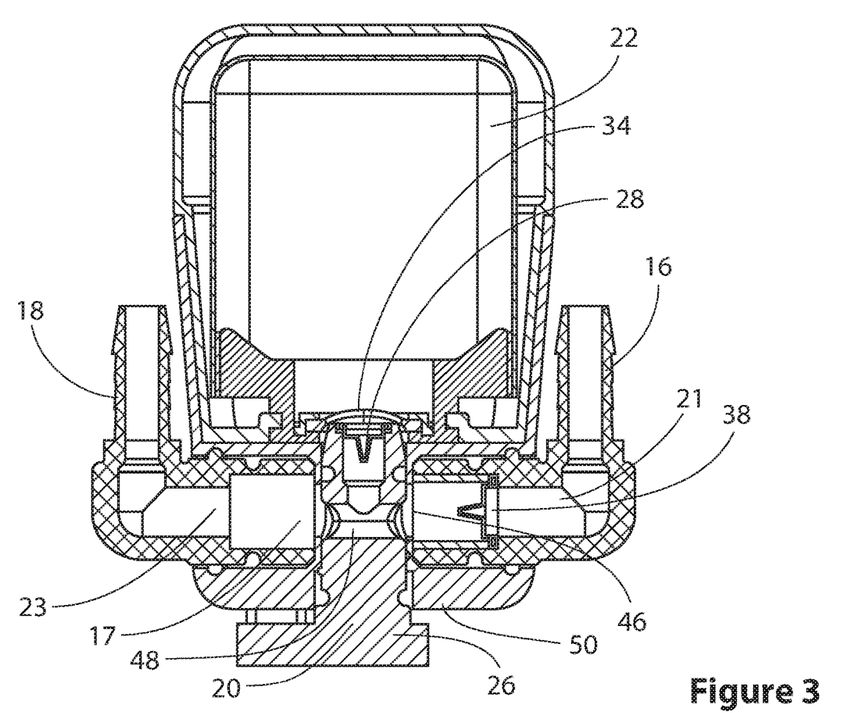
FIG. 3 is a section through the device of FIG. 1 with the selector in a disengaged position.
Figure 4:
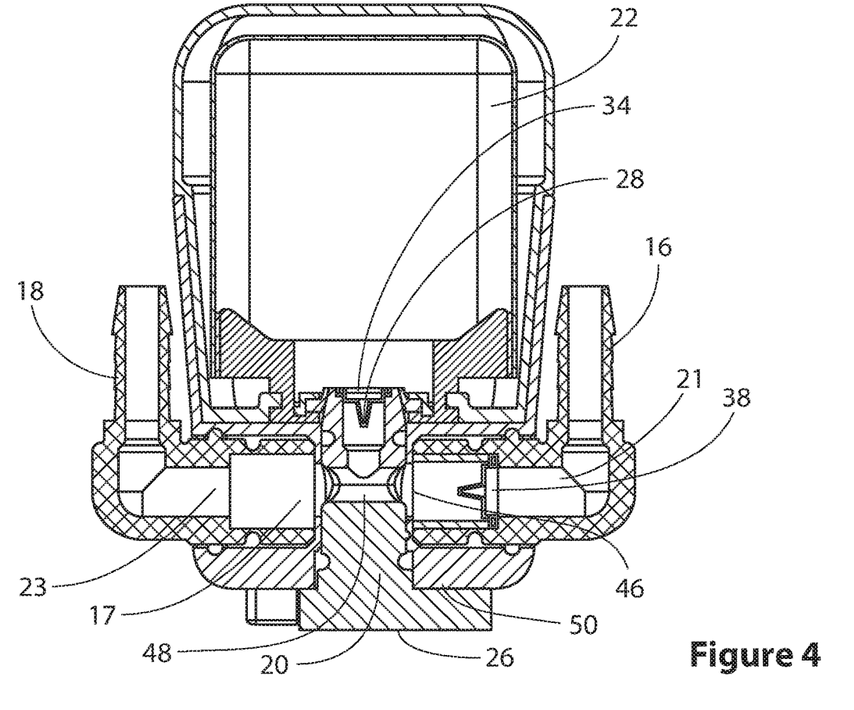
FIG. 4 is a section through the device of FIG. 1 with the selector in an engaged position.

This will be explained in more detail in connection with FIGS. 3 and 4, sections through the device 10 of FIG. 1 showing the selector 20 in the disengaged position (FIG. 3) and in the engaged position (FIG. 4).

The flow path 17 of water from the inlet 16 to the outlet 18 can be seen most clearly from these drawings, the lower housing 12 defining a housing throughbore 46 into which the inlet 16, the selector 20 and the outlet 18 are all inserted. The inlet 16 and outlet 18 being in fluid communication through a selector throughbore 48. As can be seen from FIG. 3 and FIG. 4, in both the disengaged and engaged positions, the exit 21 of the inlet 16 and the entry 23 of the outlet 18 are axially aligned with the selector throughbore 48. The relatively short distances the water and the additive have to travel within the device 10, to the point of mixing in the selector throughbore 48 and the relatively large (and adaptable) diameter allows the device to work with viscous fluids. Carbohydrate rich concentrates are viscous by nature so this is an important aspect of the invention.

In the disengaged position shown in FIG. 3, a suction applied to the outlet 18 applies pressure to both the inlet one-way valve 38 and the selector one-way valve 28, the pressure opening both valves. As the selector 20 is disengaged from the additive cartridge 22, the only liquid entering the flowpath 17 will be the liquid from the hydration reservoir which, for example, could be water through the inlet one-way valve 38. To add additive to this water, the selector 20 needs to be moved to the engaged position.

A 180° rotation of the selector lever 26 from the disengaged position, shown in FIG. 3, to the engaged position, shown in FIG. 4, moves the selector 20 towards the additive cartridge 22 such that the selector 20 pushes open the cartridge seal 34, allowing the contents of the additive cartridge 22 to be released from the additive cartridge 22 and into engagement with the selector one-way valve 28.

As the user applies a suction to the device outlet 18 pressure is applied to both inlet one-way valve 38 and selector one-way valve 28, the pressure opening both valves. As the selector 20 is engaged with the additive cartridge 22, additive and water flow into the selector throughbore 48 and the flowpath 17, towards the outlet 18 through the selector one-way valve 28 and inlet one-way valve 38 respectively.

When the user moves the selector lever 26 back to the disengaged position (FIG. 3), the selector again has travelled through 180° such that the inlet exit 21, the outlet entry 23 and the selector throughbore 48 are aligned and the selector 20 is displaced from the additive cartridge 22 which is now sealed by the cartridge seal 34 and the user only receives water when applying suction.

It will be noted from FIG. 3 that in the disengaged position, the selector lever 26 is displaced from a housing lower surface 50. In contrast in the engaged position shown in FIG. 4, the selector lever 26 has engaged the housing lower surface 50. This engagement with the lower surface 50 provides a positive indication to the user that the selector is fully engaged with the additive cartridge 22 and the inlet exit 21, the outlet entry 23 and the selector throughbore 48 are fully aligned, ensuring that a consistent additive volume will enter the water flow when a suction is applied.

Figure 5:
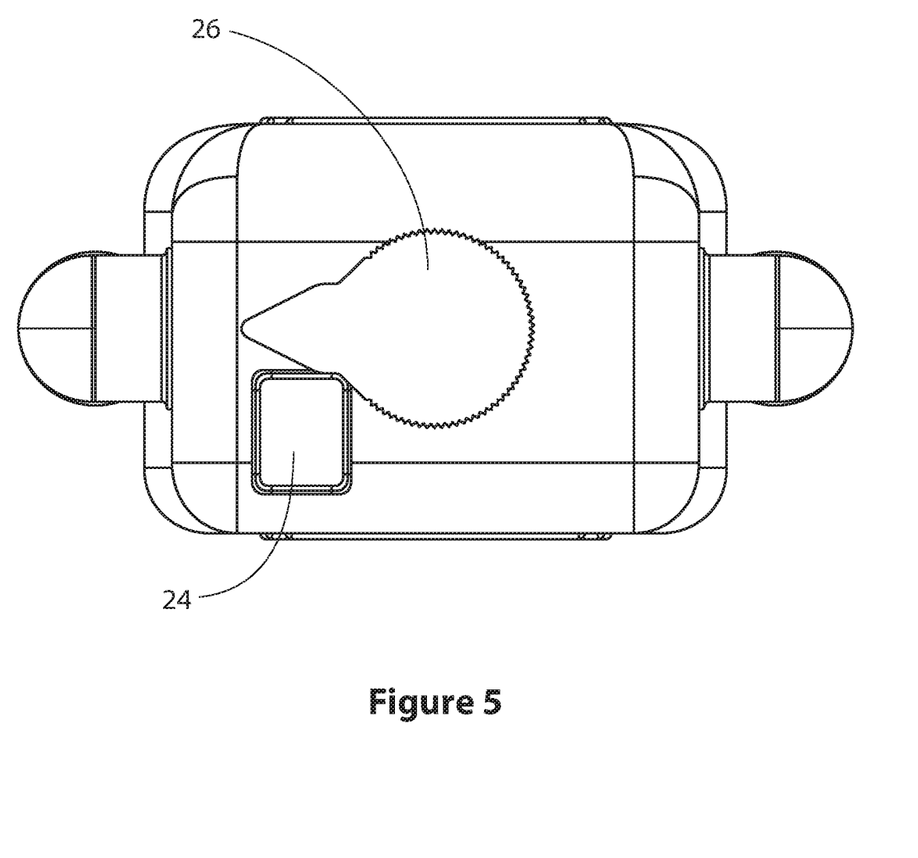
FIG. 5 is a bottom view of the device of FIG. 1.

Referring now to FIG. 5, in the disengaged position lever 26 has come up against a stop 24 which provides a positive indication to the user that the selector 20 is fully disengaged from the additive cartridge 22 and the inlet exit 21, the outlet entry 23 and the selector throughbore 48 are fully aligned ensuring that a consistent volume of water only flows through the flowpath 17 when a suction is applied. The stop 24 additionally prevents the selector 20 from being removed whilst the upper housing 14 is inserted.

The stop 24 shown in FIG. 5 is an ejection button to eject the upper housing 14 from the lower housing 12 and permit the additive cartridge 22 to be inserted or replaced as required, allowing for quick additive changes on the move.

Figure 6:
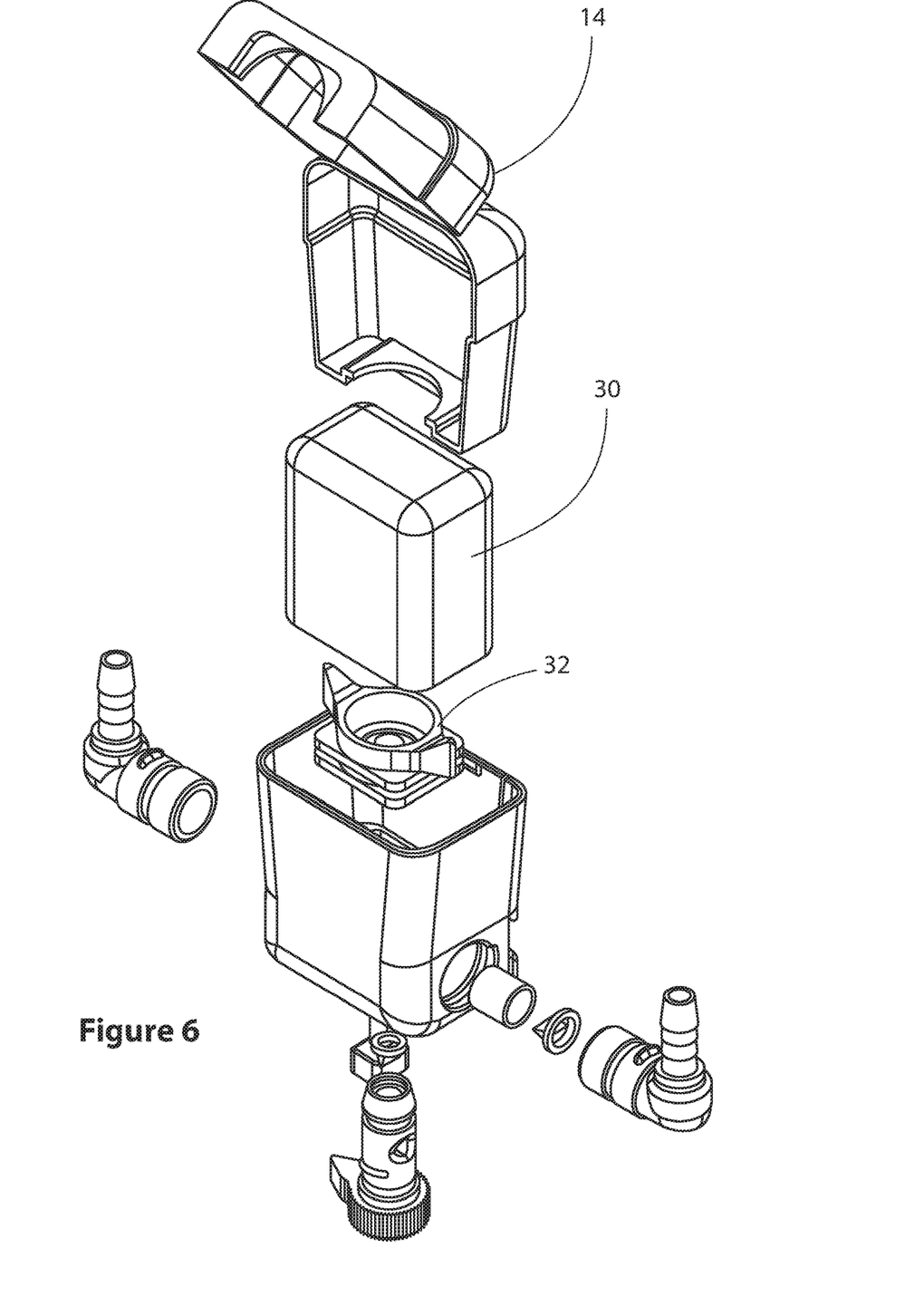
FIG. 6 is a perspective exploded view of the device of FIG. 1.

Referring to FIG. 6 the construction of the upper housing 14 and the additive cartridge 22 can best be seen. The upper housing 14 is a clam shell which clamp together around the container 30 and engaging the container closure 32.

Figure 7:
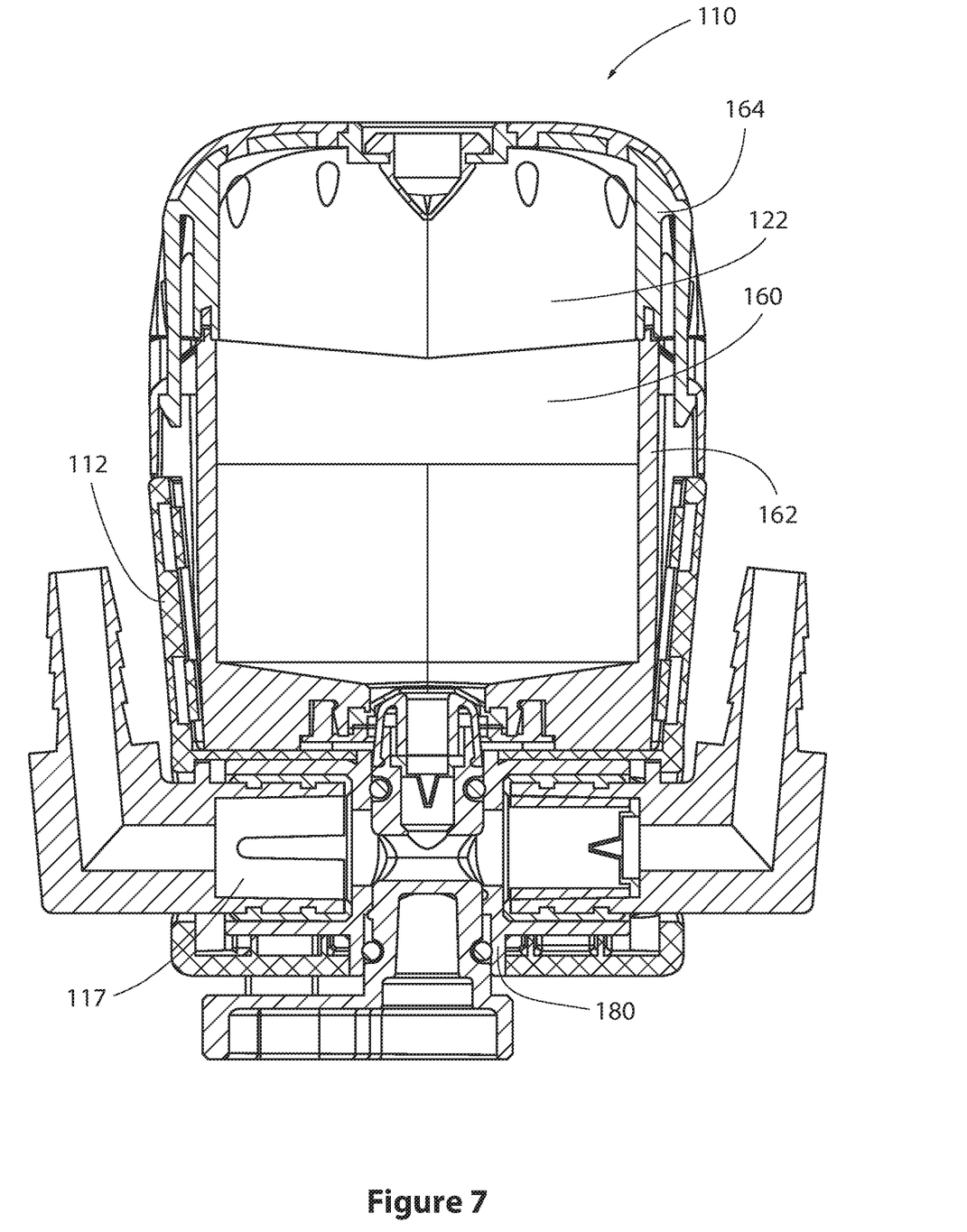
FIG. 7 is a section through a hydration device according to a second embodiment of the present invention.
Figure 8:
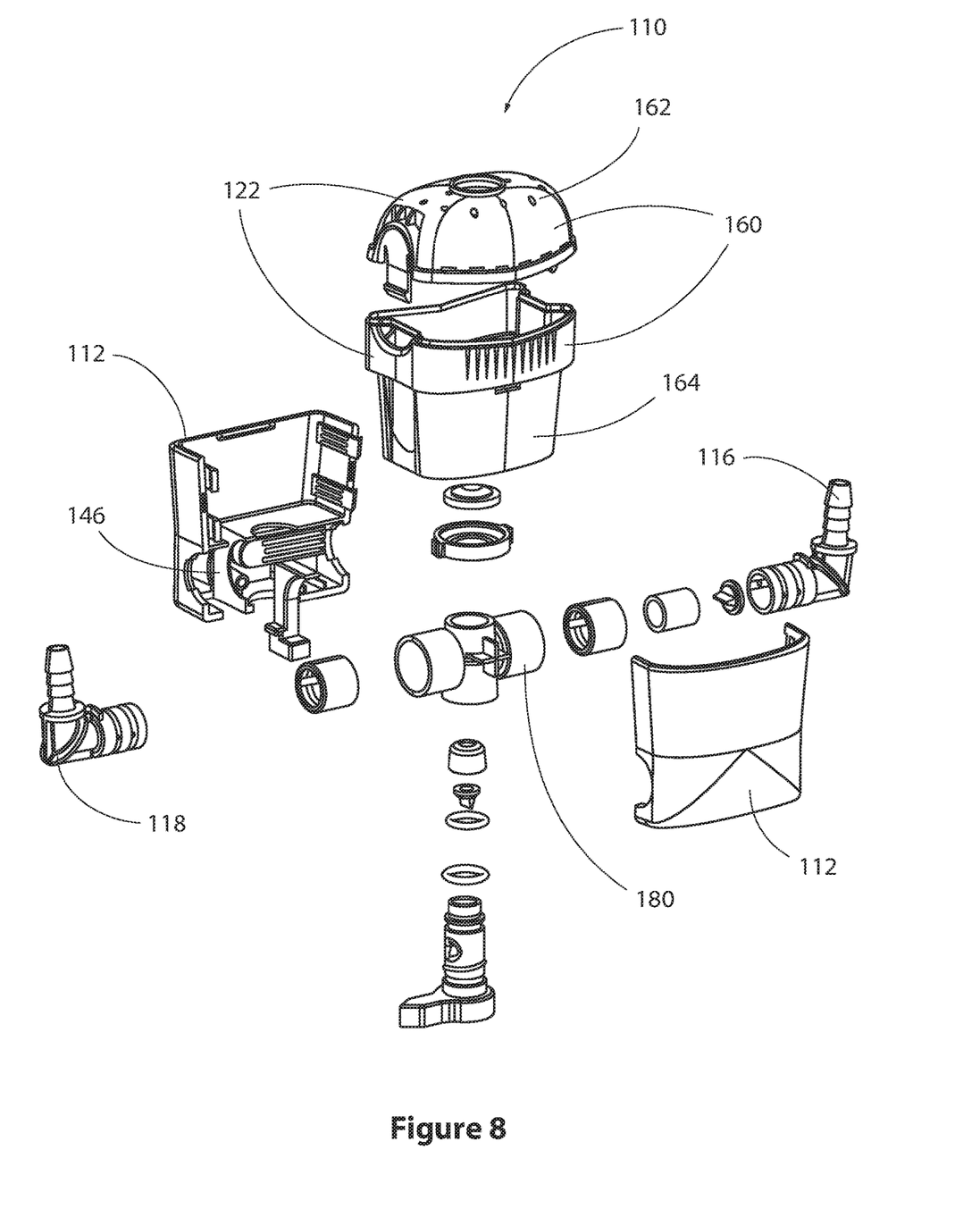
FIG. 8 is an exploded view of the device of FIG. 7.

Reference is now made to FIG. 7, a section through a portable hydration device, generally indicated by reference numeral 110, in accordance with a second embodiment of the invention, and FIG. 8 an exploded view of the device 110 of FIG. 7.

The device 110 is similar to the device 10 of the first embodiment, and similar features have been given the same reference numeral incremented by 100.

In this embodiment the receptacle 122 is in the form of a refillable vessel 160 comprising a lower vessel body 162 and an upper body vessel 164. The vessel 160 being adapted to clip inside an open top device housing 112.

The device flow path 117 incorporates a flowpath fitting 180 (most clearly seen on FIG. 8) made from a food grade material, which fits in the housing throughbore 146 and is adapted to receive the inlet 116, the outlet 118 and the selector 120. The flowpath fitting 180 prevents the fluid flowing from the inlet 116 into the selector 120 and from the selector 120 to the outlet 118 from coming into contact with the housing 112. Such an arrangement means the housing 112 does not need to be made from food grade material.

Figure 9:
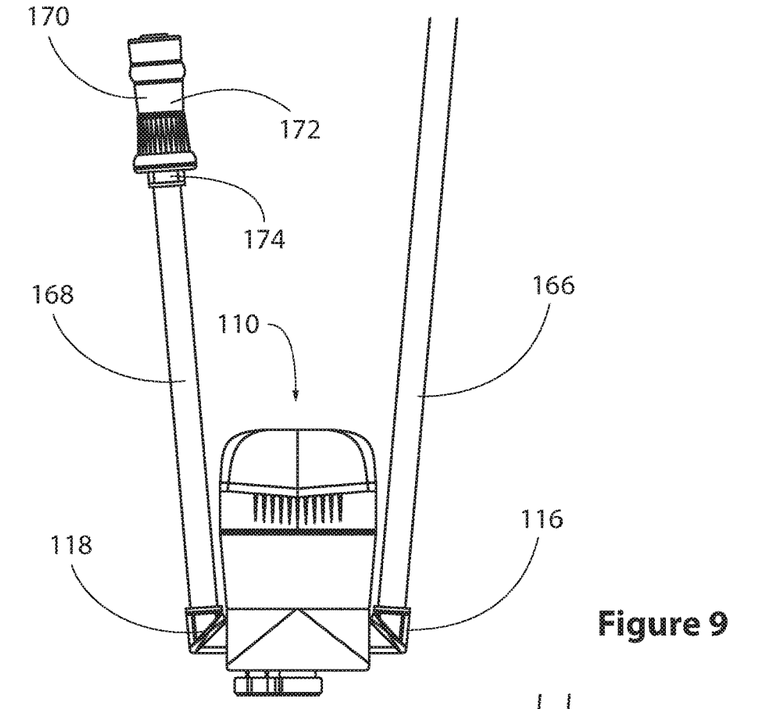
FIG. 9 is a front view of the device of FIG. 7 in a first configuration.
Figure 10:
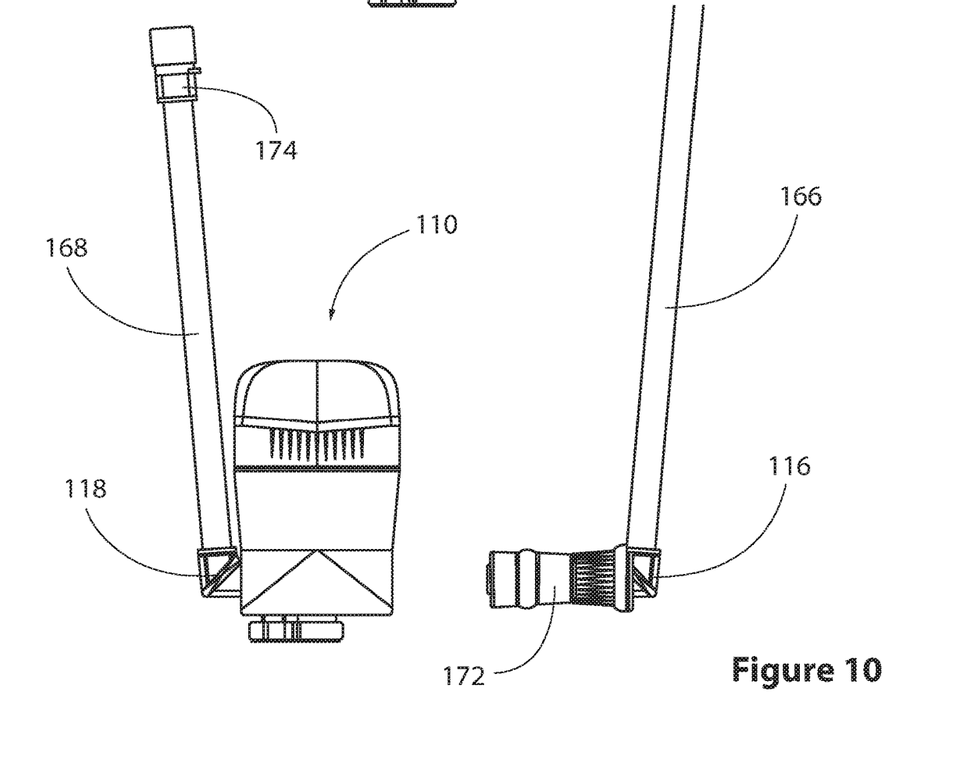
FIG. 10 is a front view of the device of FIG. 7 in a second configuration.

Reference is now made to FIG. 9 and FIG. 10, front views of the device of FIG. 7 showing the device 110, in FIG. 9, attached to an inlet tube 166 and an outlet tube 168. The inlet tube 166 is connected at a first end to a water container (not shown) and at a second end to a device inlet port 116. An outlet tube 168 is connected at a first end to a device outlet port 118 and at a second end to a user mouthpiece 170.

The user mouthpiece 170 comprises a user engagement portion 172 and an attachment portion 174. The user engagement portion 172 and the attachment portion 174 being releasably connected by a bayonet fitting. In the event of the user not wishing to use the device 110, the user can disconnect the inlet tube 166 together with the inlet port 116 from the device housing 112, and can disconnect the user engagement portion 172 from the attachment portion 174 and outlet tube 168. The user can then connect the user engagement portion 172 directly to the inlet port 116 (FIG. 10) using the inlet port's bayonet connection to allow the user to continue to drink water from the water container (not shown).

Various modifications and improvements may be made to the above-described embodiment without departing from the scope of the present invention. For example, although the additive cartridge 22 is shown as being part of the system, equally the upper housing could be a permanently sealed unit into which an additive is injected as and when required.

The selector 20 may be removable and replaceable with alternative versions of the selector 20. The internal features of selector 20 may be changed, for example, the throughbore dimensions and the type of valve, to cope with different additive mixes. This means that additives of varying compositions (such as viscosities) can be consumed and controlled simply by fitting the correct and corresponding selector 20.

In the disengaged position, the selector 20 may remain in contact with the cartridge seal 34. In some embodiments the cartridge seal 34 holds the one way seal 24 closed.

Additionally, the cartridge may be adapted to be airtight against the housing thus preventing one way valve 28 from opening.

Although the ports are described as being connected to the housing by a bayonet fitting any releasable connection mechanism could be used.

The invention claimed is:

1. A portable hydration device for use with a portable hydration system, the portable hydration device comprising:
    a housing having an inlet, configured to be in fluid communication with a reservoir of water, and an outlet configured to be in fluid communication with a mouthpiece; the housing defining a throughbore connecting the inlet and the outlet;
    a receptacle configured to be inside the housing and configured to contain an additive; and
    a selector, the selector being movable between an engaged position in which the selector is engaged with the receptacle and a disengaged position in which the selector is disengaged from the receptacle, such that in the engaged position the selector permits fluid communication between the receptacle and the housing throughbore and in the disengaged position the selector prevents fluid communication between the receptacle and the housing throughbore;
    wherein the selector defines a selector throughbore which is aligned with the housing throughbore when the selector is in the engaged and the disengaged positions; and
    wherein the selector is operable to rotate between the engaged and disengaged positions, wherein when the selector is rotated from the disengaged position to the engaged position the selector throughbore simultaneously moves laterally across the housing throughbore in a direction towards the receptacle, such that in the engaged position the selector is engaged with the receptacle thereby facilitating fluid communication between the receptacle and the housing throughbore; and
    wherein when the selector rotates from the engaged position to the disengaged position the selector throughbore simultaneously moves laterally across the housing throughbore in a direction away from the receptacle, such that in the disengaged position the selector is disengaged from the receptacle, thereby preventing fluid communication between the receptacle and the housing throughbore.

2. The portable hydration device of claim 1, wherein the additive is a liquid additive including at least one of one or more flavourings, one or more sugars, one or more electrolytes, caffeine, one or more carbohydrates, one or more sweeteners, one or more vitamins, and an other suitable additive.

3. The portable hydration device of claim 1, wherein the selector rotates 180° or a multiple of 180° in moving between the disengaged and the engaged positions.

4. The portable hydration device of claim 1, wherein the device includes an at least one indication mechanism to indicate to the user that the device is in the engaged and/or disengaged positions.

5. The portable hydration device of claim 1, wherein the receptacle includes a seal, the seal being normally closed and being opened by the selector when in the engaged position.

6. The portable hydration device of claim 1, wherein the selector includes a one way valve.

7. The portable hydration device of claim 6, wherein the housing inlet includes a one way valve.

8. The portable hydration device of claim 1, wherein the housing defines an interior void; and
wherein the interior void defines the receptacle; or
wherein the interior void is adapted to receive the receptacle.

9. The portable hydration device of claim 8, wherein the housing comprises an upper housing and a lower housing, the upper housing being separable from the lower housing to provide access to the housing void.

10. The portable hydration device of claim 8, wherein the device includes a release mechanism for releasing the upper housing from the lower housing and the release mechanism acts as an indicator mechanisms to indicate to the user that the device is in the engaged and/or disengaged positions.

11. The portable hydration device of claim 9, wherein the release mechanism acts as a stop to indicate to the user that the selector has reached the disengaged position.

12. The portable hydration device of claim 1, wherein the outlet is defined by an outlet port and the inlet defined by an inlet port, the inlet and outlet ports are interchangeable.

13. The portable hydration device of claim 12, wherein the inlet port is directly connectable to a user mouthpiece.

14. A portable hydration device for use with a portable hydration system, the portable hydration device comprising:
a housing having an inlet, configured to be in fluid communication with a reservoir of water, and an outlet configured to be in fluid communication with a mouthpiece; the housing defining a throughbore connecting the inlet and the outlet;
a receptacle configured to contain an additive; and
a selector, the receptacle being movable between an engaged position in which the selector is engaged with the receptacle and a disengaged position in which the selector is disengaged from the receptacle, in the engaged position the selector permitting fluid communication between the receptacle and the throughbore and in the disengaged position the selector preventing fluid communication between the receptacle and the throughbore;
wherein the selector defines a throughbore, the selector throughbore being aligned with the housing throughbore in the engaged and the disengaged positions.

15. The portable hydration device of claim 14, wherein the receptacle is movable with respect to the selector by pressing the receptacle towards the selector.

16. The portable hydration device of claim 14, wherein the receptacle is movable between the disengaged position and the engaged position by pressing.

17. The portable hydration device of claim 14, wherein the receptacle is movable between the engaged position and the disengaged position under the action of a spring or other mechanical device.

* * * * *